US012607605B2

(12) United States Patent (10) Patent No.: US 12,607,605 B2
Lamberti et al. (45) Date of Patent: Apr. 21, 2026

(54) SENSOR DEVICE, A PHOTO-ACOUSTIC IMAGING DEVICE AND A METHOD FOR DETECTING A MEASURAND

(71) Applicant: IMEC VZW, Leuven (BE)

(72) Inventors: Fabrice-Roland Lamberti, Rome (IT); Roelof Jansen, Heverlee (BE); Xavier Rottenberg, Kessel-Lo (BE); Jon Kjellman, Kongens Lyngby (DK)

(73) Assignee: IMEC VZW, Leuven (BE)

( * ) Notice: Subject to any disclaimer, the term of this patent is extended or adjusted under 35 U.S.C. 154(b) by 383 days.

(21) Appl. No.: 18/532,687

(22) Filed: Dec. 7, 2023

(65) Prior Publication Data

US 2024/0201138 A1 Jun. 20, 2024

(30) Foreign Application Priority Data

Dec. 16, 2022 (EP) .................................... 22214039

(51) Int. Cl.
*G01N 21/00* (2006.01)
*G01N 29/24* (2006.01)
(Continued)

(52) U.S. Cl.
CPC ............. *G01N 29/36* (2013.01); *G01N 21/00* (2013.01); *G01N 29/2418* (2013.01); *G02B 6/29335* (2013.01)

(58) Field of Classification Search
CPC ............................ G01N 21/00; G02B 6/29335
See application file for complete search history.

(56) References Cited

U.S. PATENT DOCUMENTS 9,891,382 B2 2/2018 Duraffourg et al.
10,488,588 B1* 11/2019 Seyedi ............... G02B 6/12007
(Continued)

FOREIGN PATENT DOCUMENTS

EP 3663817 A1 6/2020
EP 3663819 A1 6/2020
EP 3719457 A1 10/2020

OTHER PUBLICATIONS

Westerveld et al: "Sensitive, small, broadband and scalable optomechanical ultrasound sensor in silicon photonics", Nature Photonics, vol. 15, pp. 341-347, May 2021.
(Continued)

*Primary Examiner* — Alexander A Mercado
(74) *Attorney, Agent, or Firm* — MOSER TABOADA

(57) ABSTRACT
A sensor device comprises: a plurality of sensors, wherein each sensor comprises an optical resonance element configured to be affected by a measurand and has a mutually unique optical resonance frequency; the sensors being configured to receive at least one of a first and a second sensor interrogation signals forming a plurality of signal component pairs, wherein a difference in frequency between the frequencies in the signal component pair is different for different signal component pairs; wherein each sensor is configured to modulate an optical intensity of at least one frequency of a mutually unique signal component pair; and a detector, being configured to receive the first sensor interrogation signal and the second sensor interrogation signal, wherein the detector is configured to detect a plurality of mutually unique beat frequencies for detecting a plurality of measurements by the plurality of sensors.

15 Claims, 5 Drawing Sheets

(51) Int. Cl.
　　*G01N 29/36*　　　(2006.01)
　　*G02B 6/293*　　　(2006.01)

(56)　　　　　References Cited

U.S. PATENT DOCUMENTS

| | | | | |
|---|---|---|---|---|
| 2017/0293082 A1* | 10/2017 | Mower | .................. | H04B 10/40 |
| 2018/0306696 A1* | 10/2018 | Ozdemir | ............ | G01N 21/7746 |
| 2020/0355611 A1* | 11/2020 | Su | ......................... | G01N 21/648 |
| 2021/0294180 A1 | 9/2021 | Kuse et al. | | |
| 2022/0050043 A1* | 2/2022 | Ozdemir | ............ | G01N 15/1456 |
| 2022/0069829 A1* | 3/2022 | Seyedi | .................. | H03L 7/0995 |
| 2024/0027871 A1* | 1/2024 | Puckett | .............. | G02B 6/29341 |
| 2025/0224565 A1* | 7/2025 | Lin | ......................... | G02B 6/138 |
| 2025/0231344 A1* | 7/2025 | He | ..................... | G02B 6/12007 |
| 2025/0244635 A1* | 7/2025 | Burkley | ............. | G02B 6/29341 |

OTHER PUBLICATIONS

Lamberti et al: "Real-Time Sensing with Multiplexed Optomechanical Resonators", Nano Letters, pages A-H, Feb. 16, 2022.

Sauer et al: "Wavelength-division multiplexing of nano-optomechanical doubly clamped beam systems", Optics Letters, vol. 40, No. 9, pp. 1948-1951, May 1, 2015.

Diao et al: "Integrated on-chip nano-optomechanical systems", NRD Publications Archive, International Journal of High Speed Electronics and Systems, 26(1-2), 1740005, pp. 1-22, Apr. 27, 2018.

Minamikawa et al: "Ultrasonic wave sensing using an optical-frequency-comb sensing cavity for photoacoustic imaging", OSA Continuum, vol. 2, No. 2, pp. 439-449, Feb. 15, 2019.

Extended European Search Report in EP22214039.4 dated Jun. 12, 2023.

* cited by examiner

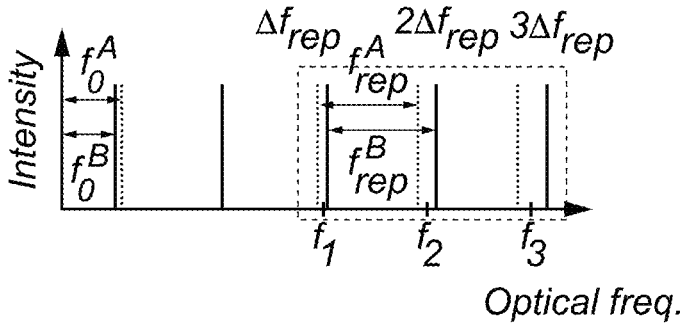
*Fig. 3a*
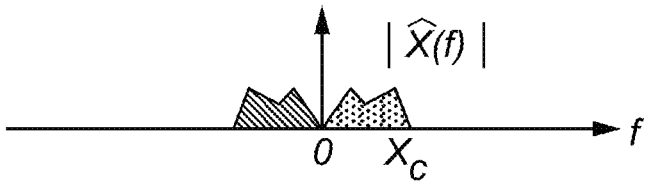
*Fig. 3b*
*Fig. 4a*
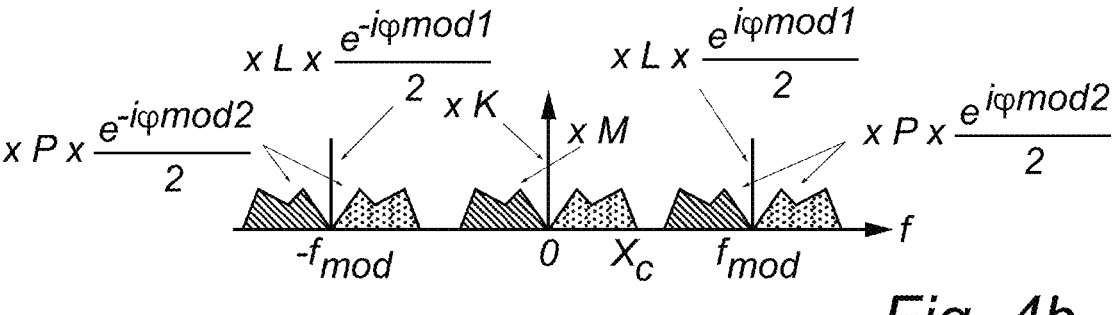
*Fig. 4b*

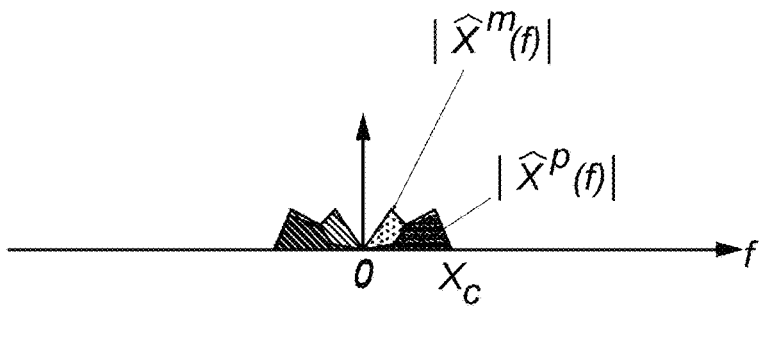

$$|\widehat{X}^m(f)|$$

$$|\widehat{X}^p(f)|$$

*Fig. 5a*

$$x\,L^m x\,\frac{e^{-i\varphi^m_{mod1}}}{2}$$

$$x\,P^m x\,\frac{e^{-i\varphi^m_{mod2}}}{2}$$

$$xP^m x\,\frac{i\varphi^m_{mod2}}{2}$$

$$x\,L^p x\,\frac{e^{-i\varphi^p_{mod1}}}{2}$$

$$xL^m x\,\frac{i\varphi^m_{mod1}}{2}$$

$$xL^p x\,\frac{i\varphi^p_{mod1}}{2}$$

$$x\,(K^m+K^p)$$

$$xM^m$$

$$-f^p_{mod} \qquad -f^m_{mod} \qquad 0 \qquad X_c \qquad f^m_{mod} \qquad f^p_{mod}$$

$$xM^p$$

$$x\,P^p x\,\frac{e^{-i\varphi^p_{mod2}}}{2}$$

$$xP^p x\,\frac{i\varphi^p_{mod2}}{2}$$

*Fig. 5b*

SENSOR DEVICE, A PHOTO-ACOUSTIC IMAGING DEVICE AND A METHOD FOR DETECTING A MEASURAND

CROSS-REFERENCE TO RELATED APPLICATIONS

The present application claims the benefit of and priority to EP Patent Application Ser. No. 22214039.4, filed Dec. 16, 2022, the entire contents of which is incorporated herein by reference.

TECHNICAL FIELD

The present description relates to a sensor device comprising a plurality of sensors, each comprising an optical resonance element. The optical resonance element is configured to be affected by a measurand for detecting the measurand. In particular, the present description relates to a photo-acoustic imaging device comprising the sensor device. The present description also relates to a method for detecting the measurand.

BACKGROUND

Optical resonance elements are used in various sensor applications. The optical resonance elements define an optical resonance at a wavelength. The optical resonance may be modified by a measurand that is to be measured such that the measurand may be determined based on an effect on optical resonance caused by the measurand.

The optical resonance elements may for instance be used in photo-acoustic imaging, wherein a measurand in form of an acoustic wave may be detected based on the acoustic wave affecting optical resonance of an optical resonance element. The acoustic wave may for instance provide a response from living tissue being subject to an optical pulse which generates the acoustic wave in the tissue. In order for an image to be formed based on detection of the acoustic wave, a large number of optical resonance elements, each associated with a respective sensor, may be needed.

In view of using a plurality of sensors having optical resonance elements, there is a need for an efficient manner of reading signals from the plurality of sensors. In particular, there is a need to allow simultaneous reading of signals from the plurality of sensors while using a simple scheme for reading the signals.

SUMMARY

An objective of the present description is to facilitate parallel read-out of optical signals based on detection of a measurand by a plurality of sensors.

This and other objectives are at least partly met by the invention as defined in the independent claims. Preferred embodiments are set out in the dependent claims.

According to a first aspect, there is provided a sensor device comprising: a plurality of sensors, wherein each sensor comprises an optical resonance element, wherein an optical characteristic of the optical resonance element is configured to be affected by a measurand to be measured by the sensor and wherein each sensor in the plurality of sensors has a mutually unique optical resonance frequency; the plurality of sensors being configured to receive at least one of a first and a second sensor interrogation signals, wherein the first sensor interrogation signal comprises a first optical frequency comb of first frequencies defining a plurality of first signal components being separated by a first repetition frequency, wherein the second sensor interrogation signal comprises a second optical frequency comb of second frequencies defining a plurality of second signal components being separated by a second repetition frequency different from the first repetition frequency, wherein each of the plurality of first signal components is associated with a respective one of the plurality of second signal components to form a plurality of signal component pairs, wherein a difference in frequency between the associated first signal component and second signal component is different for different signal component pairs; wherein an optical resonance of the optical resonance element of each sensor is associated with one, mutually unique, signal component pair of the plurality of signal component pairs such that each sensor is configured to modulate the at least one of the first and second sensor interrogation signal by the measurand to modulate an optical intensity and/or phase of at least one of the associated first signal component and second signal component of the mutually unique signal component pair; and a detector, being configured to receive the first sensor interrogation signal and the second sensor interrogation signal, at least one of which being modulated by the plurality of sensors being affected by the measurand, wherein the detector is configured to detect a plurality of beat frequencies corresponding to mutually unique differences in frequency between the associated first signal component and second signal component for different signal component pairs for detecting a plurality of measurements by the plurality of sensors.

The sensor device uses sensor interrogation signal(s) to read out information of the measurand from each of the sensors. The first and second optical frequency combs of the sensor interrogation signals are related to the optical resonance frequencies of the optical resonance elements of the plurality of sensors such that a single frequency of each of the first and second optical frequency comb is associated with one optical resonance element. This implies that the measurand affecting the optical resonance element of a particular sensor will only affect one signal component (associated with one frequency) of the first and second optical frequency combs. Hence, it is possible to distinguish signals from different sensors from each other since different sensors affect different signal components (associated with different beat frequencies) in the optical frequency combs. Further, the signal components having frequencies of the first and second optical frequency combs which do not correspond to the optical resonance frequency of the sensor will not be affected by the sensor.

In addition, the signal components of the first optical frequency comb and the second optical frequency comb are associated such that a signal component pair comprising one frequency of the first optical frequency comb and one frequency of the second optical frequency comb is associated with one optical resonance element. Different optical resonance elements are associated with different signal component pairs such that the optical resonance elements are associated with mutually unique signal component pairs. Hence, each sensor only affects one signal component pair and different sensors affect different signal component pairs. Each sensor may affect both the first and the second sensor interrogation signal or only one of the first and the second sensor interrogation signal.

Each signal component pair defines a beat frequency based on the difference in frequency between the first frequency and the second frequency of the signal component pair. The beat frequency is much lower than the first and the second frequencies of the signal component pair. This implies that variation in time of optical intensity of the signal component pair, which transduces a time trace of the measurand measured by the associated sensor and modulated at the beat frequency, may be followed.

Since the first repetition frequency is different from the second repetition frequency, the beat frequency will be different for different signal component pairs. This implies that the modulation of the at least one of the first and second sensor interrogation signals by the measurand will be discriminated to different beat frequencies associated with the different sensors. Hence, the information of the measurand as acquired by the different sensors is present within signal component pairs having different beat frequencies. Therefore, the information acquired by the different sensors may be simultaneously read out as it is possible to separate information from different sensors by analyzing signal component pairs having different beat frequencies from a combination of the first sensor interrogation signal with the second sensor interrogation signal.

The detector may comprise a photo-sensitive element configured to detect the first sensor interrogation signal and the second sensor interrogation signal. For instance, the detector may comprise a single photo-sensitive element configured to simultaneously receive the first sensor interrogation signal and the second sensor interrogation signal. A signal detected by the single photo-sensitive element may then be analyzed in order to separate information within different signal component pairs having different beat frequencies corresponding to measurements of the measurand by different sensors. This implies that the read-out of measurements by the plurality of sensors may be performed in a simple manner while allowing read-out to be performed simultaneously.

It should be realized that, although it may be possible to use a single photo-sensitive element, the detector may comprise a plurality of photo-sensitive elements that cooperate in reading out information from the first and second sensor interrogation signals.

The first sensor interrogation signal and the second sensor interrogation signal may both be guided to the plurality of sensors such that the measurand affecting the optical resonance elements of the sensors will modulate both the first and the second sensor interrogation signal. However, according to an alternative, only one of the first and the second sensor interrogation signal is guided to the plurality of sensors and, hence, the measurand will modulate only one of the first and the second sensor interrogation signal. Hence, one sensor interrogation signal may be modulated by the measurand, whereas another sensor interrogation signal may be directly transferred to the detector for the sensor interrogation signals to be combined at the detector.

The sensor device may comprise two or more sets of plurality of sensors. In such case, the plurality of sensors of a first set may be configured to receive at least one of a first and a second sensor interrogation signals and the plurality of sensors of a second set may be configured to receive at least one of a third and a fourth sensor interrogation signals, wherein the third and the fourth sensor interrogation signals have optical frequency combs comprising a third and a fourth repetition frequency. This would be useful, for instance, if the optical resonance frequencies of the plurality of sensors of the first set is distributed over a wavelength range which is larger than one that can be covered by optical frequency combs generated by a dual comb light source. Thus, the first and the second sensor interrogation signal may be generated by a first dual comb light source and the third and the fourth sensor interrogation signal may be generated by a second dual comb light source.

As used herein, the term "measurand" should be construed as any quantity, object, or property intended to be measured. Given as a non-limiting example, the measurand may be a temperature or a mass or another quantity. Given as another non-limiting example, the measurand may be electro-magnetic radiation or an acoustic wave incident on the optical resonance element. The measurand may be representative of an object interacting with or emitting the electro-magnetic radiation or the acoustic wave. Given as yet another non-limiting example, the measurand may be an object that interacts with the optical resonance element.

The optical resonance element may be affected by the measurand in a manner that may be read out using the sensor interrogation signals, such that a measurement of the measurand is acquired by the sensor.

The optical resonance element may be affected by the measurand such that any optical characteristic is affected. For instance, the optical resonance is affected, e.g., the measurand may affect the optical resonance element such that the optical resonance frequency may be changed. However, the optical resonance element may alternatively or additionally be affected by the measurand such that a transmission, reflection, absorption, or scattering by the optical resonance element may be directly affected.

The optical resonance element defines optical resonances. The optical resonance element may be designed in many different ways for defining the optical resonances. For instance, the optical resonance element may comprise a loop, such as a ring, disk, or sphere, for allowing an optical signal to travel around the loop. At an optical resonance frequency, constructive interference occurs for optical signals making different number of round-trips around the loop. Alternatively, the optical resonance element may comprise a Fabry-Pérot resonator, defining an optical resonator between two reflective elements. As yet another alternative, the optical resonance element may comprise a photonic crystal structure.

It should be realized that each optical resonance element has a set of optical resonance frequencies. A selected optical mode of the optical resonance element may be associated with one of these optical resonance frequencies. The selected optical mode for each sensor may be mutually unique for each sensor.

The sensor interrogation signal may be configured to interact with the optical resonance element. Interaction of the sensor interrogation signal with the optical resonance element may be limited to signal components having frequencies within a bandwidth of an optical mode of the optical resonance element. Hence, only the signal components of the sensor interrogation signals of the signal component pair with which the optical resonance element of a sensor is associated may interact with the sensor.

For instance, the sensor interrogation signal may be coupled into the optical resonance element in dependence of the frequency of the signal component of the sensor interrogation signal corresponding to the optical resonance frequency. Hence, transmission of the signal component by the optical resonance element may depend on how well the frequency of the signal component corresponds to the optical resonance frequency. Signal components having frequencies that are not related to the optical resonance frequency, i.e., frequencies of the signal component pairs that are not spectrally located in the optical mode, will not be affected by the optical resonance element. Such signal components may possibly be affected by being attenuated by the optical resonance element, but the signal components will not be affected by the measurand.

According to an embodiment, the signal component with the frequency corresponding to the optical resonance frequency may be coupled into the optical resonance element such that intensity of the sensor interrogation signal is reduced at the signal component with the frequency corresponding to the optical resonance frequency. However, it should be realized that, in other embodiments, the optical resonance element may be configured to provide a maximum transmission at the optical resonance frequency such that intensity of the sensor interrogation signal transmitted by the optical resonance element is high if the frequency of the signal component matches well with the optical resonance frequency.

The detector may be configured to receive a transmitted portion of the sensor interrogation signal. If an optical resonance translates into a minimum of transmission and a frequency of the signal component corresponds well with the optical resonance frequency, an intensity of the signal component of the sensor interrogation signal reaching the detector is therefore low. If an optical resonance translates into a maximum of transmission and a frequency of the signal component corresponds well with the optical resonance frequency, an intensity of the signal component of the sensor interrogation signal reaching the detector is therefore high. The detector may alternatively be configured to receive a reflected, absorbed, or scattered portion of the sensor interrogation signal. Again, if an optical resonance translates into a maximum/minimum of reflection, absorption, or scattering, and if a frequency of the signal component corresponds well with the optical resonance frequency, an intensity of the signal component of the sensor interrogation signal is therefore high/low.

The optical resonance frequency of the optical resonance element may be slightly changed by the measurand. This implies that interaction of the signal component of the sensor interrogation signal with the optical resonance element, such as coupling of the signal component of the sensor interrogation signal into the optical resonance element, may be altered by the measurand. In this manner, transmission, or alternatively reflection, absorption, or scattering, of the signal component of the sensor interrogation signal by the optical resonance element, may be altered by the measurand. This implies that the optical intensity of the signal component of the sensor interrogation signal with which the optical resonance element is associated will be modulated by the measurand.

The optical resonance frequency of the optical resonance element may define one characteristic of an optical mode. The signal component may be coupled to the optical mode even if the frequency of the signal component does not exactly match the optical resonance frequency. Thus, even if the optical resonance frequency is changed by the measurand, the frequency of the signal component of the sensor interrogation signal with which the optical resonance element is associated may still be coupled to the optical mode. However, the interaction between the signal component and the optical resonance element may be affected by the change of the optical resonance frequency, such that transmission, reflection, absorption, or scattering, of the sensor interrogation signal by the optical resonance element may be affected. Also or alternatively, the interaction between the signal component and the optical resonance element may be affected by the measurand, such that transmission, reflection, absorption, or scattering of the sensor interrogation signal by the optical resonance element may be directly affected by the measurand.

The signal component may be coupled into the optical resonance element, which may be used for causing transmission, reflection, absorption, or scattering of the signal component. However, the signal component may interact with the optical resonance element in alternative manners, such as to cause a phase change of the signal component.

The optical resonance element may be configured in many different manners such that the measurand alters the optical resonance frequency or directly alters transmission, reflection, absorption, or scattering of the signal component of the sensor interrogation signal by the optical resonance element.

For instance, the optical resonance element may comprise an optical waveguide forming a loop, which is arranged on a membrane. Alternatively, the optical resonance element is placed in vicinity of the membrane so that it is optically and/or mechanically coupled to the membrane. Thus, a measurand may affect the membrane so as to alter the shape of the membrane such that a length of the loop of the optical waveguide is changed so as to change the optical resonance frequency. Alternatively or additionally, an optical property, such as the refractive index of the optical resonance element or of a material surrounding the optical resonance element may be changed so as to change the optical resonance frequency. An optical resonator coupled to a mechanical system defines an opto-mechanical system.

According to an alternative embodiment, the measurand may affect coupling of the sensor interrogation signal into an optical waveguide of the optical resonance element or the measurand may affect loss of the sensor interrogation signal in the optical waveguide. Thus, the measurand may alter transmission of the signal component of the sensor interrogation signal by the optical resonance element.

Optical resonance elements of different sensors have different optical resonance frequencies. Further, the sensors have mutually unique optical resonance frequencies. The optical resonance frequencies of different sensors may be separated such that there is no overlap of optical modes associated with the optical resonance frequencies.

The frequencies of the first optical frequency comb may be separated such that a single first frequency may correspond to the optical resonance frequency of a particular sensor. The first sensor interrogation signal comprises a plurality of first signal components, wherein each first signal component is defined by a first frequency, such that each first signal component is a signal with a single first frequency. Similarly, the frequencies of the second optical frequency comb may be separated such that a single second frequency may correspond to the optical resonance frequency of the particular sensor. The second sensor interrogation signal comprises a plurality of second signal components, wherein each second signal component is defined by a second frequency, such that each second signal component is a signal with a single second frequency. Thus, the optical resonance element of the sensor is associated with a single signal component pair comprising a first signal component (having a first frequency) and a second signal component (having a second frequency). Further, the optical resonance elements of different sensors are associated with different signal component pairs.

The optical frequency combs may comprise a plurality of discrete frequencies. The discrete frequencies may be equally separated from each other defining a repetition frequency of the optical frequency comb. The first frequencies of the first optical frequency comb may be related to the second frequencies of the second optical frequency comb such that one first frequency is arranged between two subsequent second frequencies, and vice versa. Hence, each first signal component may be associated with a second signal component, such that a difference between the first frequency of the first signal component and the associated second frequency of the second signal component is smaller than the first repetition frequency (and smaller than the second repetition frequency). The first signal component and the associated second signal component may form a signal component pair. In this manner, a plurality of signal component pairs comprising a first frequency and a second frequency may be defined. The difference in frequency between the first frequency and the associated second frequency may be very small and much smaller than the first repetition frequency (and the second repetition frequency).

Each sensor may be configured to modulate the optical intensity at the least one frequency in the signal component pair associated with the optical resonance element of the sensor. The sensor may modulate the optical intensity by the sensor being affected by the measurand. In addition or alternatively to modulating the optical intensity, the sensor may further be configured to modulate phase of at least one of the associated first signal component and second signal component of the signal component pair.

The detector may be configured to detect the first sensor interrogation signal and the second sensor interrogation signal for enabling analysis of information carried by the first sensor interrogation signal and the second sensor interrogation signal. As the first sensor interrogation signal and the second sensor interrogation signal are optical signals comprising the first optical frequency comb and the second optical frequency comb, respectively, the detector may suitably be any kind of detector configured to detect an optical signal. For instance, the detector may comprise a photo-sensitive element which may convert an incident optical signal to an electrical signal, such as a photo-diode or a photo-multiplier tube.

The photo-sensitive element may be configured to be sensitive to all frequencies of the frequency pairs. In embodiments, multiple photo-sensitive elements being sensitive to different optical frequencies may be used in order to enable detecting all frequencies of the frequency pairs included in the first sensor interrogation signal and the second sensor interrogation signal. If a broad band of frequencies are present among the frequency pairs, a single photo-sensitive element sensitive to all optical frequencies may not be readily available.

The first sensor interrogation signal may be combined with the second sensor interrogation signal before reaching the detector. In fact, the first sensor interrogation signal and the second sensor interrogation signal may be simultaneously guided in a common waveguide to interact with the sensors. Alternatively, the first sensor interrogation signal and the second sensor interrogation signal may be simultaneously incident at the detector to be combined at the detector.

The detector may be configured to acquire a time-varying signal. Thanks to the differences in frequency between the first frequency and the associated second frequency of each signal component pair, the detector may detect beat frequency signals corresponding to the frequency difference within the signal component pairs. The detector may thus acquire a time-varying signal wherein the signal of the respective beat frequencies is manifested. The time-varying signal acquired by the detector may then be further analyzed in order to extract information relating to each beat frequency, which allows information of the measurand as sensed by each sensor to be determined.

According to an embodiment, the sensor device further comprises at least one source configured to generate the first optical frequency comb and the second optical frequency comb.

Thus, the at least one source may be configured to generate the first optical frequency comb for forming the first sensor interrogation signal and the second optical frequency comb for forming the second sensor interrogation signal.

The at least one source may be configured to generate a signal component pair, i.e., two frequencies, per sensor of the sensor device. The frequencies are provided in two optical frequency combs, with two different repetition frequencies. In an embodiment, these first and second optical frequency combs may be generated by a single source forming a dual comb source. However, in another embodiment, the sensor device may comprise a first source configured to generate the first optical frequency comb and a second source configured to generate the second optical frequency comb.

The at least one source may be implemented in various ways as understood by the person skilled in the art. For example, the at least one source may comprise at least one light source, such as a laser configured to generate an optical frequency comb, such as a mode-locked laser, a micro-ring resonator pumped by a monochromatic laser to generate solitons, or a monochromatic laser with output modulated by one or more electro-optic modulators.

Each sensor may be associated with two unique frequencies, one first frequency and one second frequency of the first and second optical frequency comb, respectively. Thus, if the sensor device comprises many sensors, a large number of frequencies need to be generated. Each source may be configured to generate a plurality of frequencies, such as using a single source forming a dual comb source or using a first and a second source for generating the first and second optical frequency comb, respectively. Hence, even if the first and second sensor interrogation signals comprise a large number of frequencies, these may be generated by a relatively simple source, e.g., comprising one or two source units.

The at least one source may be configured for tuning a repetition frequency and/or an offset frequency. The at least one source may thus be tuned to fit the optical resonance frequencies of the optical resonance elements of the sensors. This may be useful for instance if the optical resonance frequencies due to manufacturing tolerances slightly differentiate from a nominal value.

According to an embodiment, a frequency offset between signal component pairs of the plurality of signal component pairs is larger than an optical mode bandwidth of the optical resonance elements of the sensors associated with the signal component pairs.

This ensures that a sensor will be associated with a single signal component pair. Hence, each sensor will modulate only the first and/or the second signal component of the single signal component pair with which the sensor is associated.

The optical resonance elements may be designed such that the optical resonance frequencies are spectrally isolated. Thus, the optical resonance elements may be designed such that there is no overlap between the optical modes for different sensors.

The optical resonance elements may further be designed such that the optical resonance frequencies of the optical resonance elements are arranged in a periodic fashion. This implies that the optical frequency combs of the first and second sensor interrogation signals having repetition frequencies may define frequency pairs that correspond to the optical resonance frequencies of the optical resonance elements.

In an embodiment, the optical modes of the optical resonance elements may be tuned. For instance, the optical resonance frequencies may be tuned in order to align the optical resonance frequencies to the first and second optical frequency combs. Tuning of the optical resonance frequency may be achieved using, e.g., an electro-optical, thermo-optical, or mechanical-optical coupling effect.

Tuning of the optical resonance frequency may be used for compensation of misalignment between the optical resonance frequencies and the first and second optical frequency combs due to manufacturing imperfections, or for compensation of changes to the optical resonance frequencies based on varying external conditions to the sensor device, such as a variation in ambient temperature.

According to an embodiment, a frequency offset between beat frequencies correspond to a difference between the first repetition frequency and the second repetition frequency and wherein the frequency offset between beat frequencies is larger than two times a cut-off frequency of sensitivity of the plurality of sensors.

The cut-off frequency of sensitivity of a sensor may define a maximum frequency that the sensor is able to detect. Alternatively, the cut-off frequency of sensitivity may define a maximum frequency of a measurand signal, i.e., the maximum frequency being sensed.

The measurand signal is configured to affect optical intensity and/or phase of a signal having the beat frequency. Thus, a frequency range of the measurand signal is combined with the beat frequency so that there is a frequency span based on the frequency range of the measurand signal around the beat frequency, which frequency span carries information of the measurand signal. Thus, information of the measurand may be provided in a frequency range corresponding±the cut-off frequency around the beat frequency.

Thanks to different beat frequencies differing by at least a frequency offset larger than two times the cut-off frequency, signals corresponding to different sensors are spectrally isolated from each other in the first and second sensor interrogation signals.

According to an embodiment, the sensor device further comprises read-out circuitry, which is configured to receive a measurement signal from the detector and is configured to separate signals corresponding to different beat frequencies for separate read-out of measurements by each sensor of the plurality of sensors.

The detector may be configured to generate a measurement signal which comprises multiplexed information of the measurand as sensed by the plurality of sensors. The information is multiplexed in that the different beat frequencies carries information from different sensors.

Thus, using read-out circuitry, the sensor device may further be configured to separate the information corresponding to different sensors, such that measurements by the sensors are separated. In other words, the read-out circuitry may demultiplex the information of the measurement signal.

It should be realized that the measurement signal from the detector may alternatively be transmitted to an external device, such that the sensor device itself need not be configured to separate the signals corresponding to different beat frequencies.

According to an embodiment, the read-out circuitry is configured to form separate signals in separate read-out channels, wherein each read-out channel is configured to demodulate the measurement signal using a demodulation signal having a frequency corresponding to the respective beat frequency.

The use of the demodulation signal allows each channel to locate components of the measurement signal corresponding to a specific sensor to be arranged around zero. This facilitates selection in each read-out channel of the measurement acquired by a particular sensor.

The demodulated measurement signal may further be low pass filtered in order to remove signals corresponding to measurements acquired by all other sensors but the particular sensor from which the read-out channel is intended to read measurement information. The demodulated measurement signal may alternatively be band pass filtered to remove both DC components and signal form other sensors.

The detector may generate the measurement signal as an electrical signal. The demodulation signal of each read-out channel may then be provided in electrical domain.

According to an embodiment, each read-out channel is further configured to remove DC components of the measurement signal.

The measurand may provide a time-varying signal acquired by the sensors. By removing the DC components of the measurement signal, only the time-varying signal of the measurand is maintained in the read-out channel, facilitating accurate read-out of information of the measurand.

If the measurand comprises a DC component, the DC component of the measurement signal should not be removed. In such case, calibration of the sensor device may be performed in order to determine a DC background, which may be subtracted from measurement of DC components to determine the DC components of the measurand.

According to an embodiment, the plurality of sensors are configured to receive both the first and the second sensor interrogation signals, wherein each sensor is configured to modulate both the first and the second sensor interrogation signal by the measurand to modulate the optical intensity and/or phase of the associated first signal component and second signal component; and wherein the detector is configured to receive the first sensor interrogation signal and the second sensor interrogation signal, both of which being modulated by the plurality of sensors being affected by the measurand.

This implies that the first and the second sensor interrogation signal may be transported in a common fashion, e.g., in a common waveguide, for both being modulated by the sensors. Hence, the first and the second sensor interrogation signal may be transported in a simple manner and there is no need for a specific set-up for combining the first sensor interrogation signal and the second sensor interrogation signal before the signals are received by the detector.

According to another embodiment, the plurality of sensors are configured to receive the first sensor interrogation signals, wherein each sensor is configured to modulate the first sensor interrogation signal by the measurand to modulate the optical intensity and/or phase of the associated first signal component; and wherein the detector is configured to receive the first sensor interrogation signal being modulated by the plurality of sensors being affected by the measurand and the second sensor interrogation signal being unaffected by the plurality of sensors.

Thus, according to an alternative, only the first sensor interrogation signal is modulated by the sensors. The second sensor interrogation signal may be separately transported and combined with the first sensor interrogation signal having been modulated by the plurality of sensors before the first and the second sensor interrogation signals are received by the detector.

Thanks to only the first sensor interrogation signal being modulated by the sensors, the second frequencies of the second sensor interrogation signal need not necessarily correspond to the optical resonance frequencies of the optical resonance elements. Rather, the second frequencies may differ from the first frequencies in the signal component pairs so that the second frequencies need not be able to couple to the optical modes associated with the optical resonance frequencies. This implies that there is a larger freedom in defining the beat frequencies of the frequency pairs.

According to an embodiment, each sensor is configured to sense the measurand by the optical resonance frequency of the optical resonance element being changed in dependence of the measurand.

This is an efficient manner of sensing the measurand with high sensitivity, since a slight change in the optical resonance frequency may provide a large difference in modulation of optical intensity of the sensor interrogation signal. In particular, efficient sensing may be provided if the frequencies of the signal components are arranged at a flank of a resonance curve of the optical resonance element.

The sensor may alternatively or additionally sense the measurand by an optical quality factor or a resonance strength (contrast) of the optical resonance element being changed in dependence of the measurand.

The sensor may alternatively or additionally sense the measurand by transmission, reflection, absorption, or scattering of the optical resonance element being directly changed in dependence of the measurand.

According to an embodiment, each sensor is configured to generate a time-varying modulation of the at least one of the first and second sensor interrogation signal by receiving a time-varying measurand signal.

Thus, the sensor device may be configured for sensing time-varying signals. Each sensor may be configured to modulate the sensor interrogation signals based on the time-varying measurand signal, such that the information of the time-varying measurand signal is provided at the beat frequency associated with the sensor. The time-varying measurand signal may then be easily extracted from a measurement signal provided by the detector.

According to an embodiment, the optical resonance element of each sensor is a waveguide resonator.

This implies that an optical resonance frequency may be defined based on constructive interference occurring for optical signals making different number of round-trips in the waveguide resonator. The waveguide resonator may be arranged so as to allow the optical resonance frequency to be easily changed by a measurand. For instance, if the waveguide resonator is arranged on or in vicinity of a membrane, deflection of the membrane due to the measurand may change length of the waveguide resonator or its optical properties for changing the optical resonance frequency.

The sensor interrogation signal(s) may also be easily coupled to the waveguide resonator. The sensor interrogation signal(s) may be transported in a waveguide arranged close to the waveguide resonator. The waveguide may be formed from any material suitable for propagating the sensor interrogation signal, which may be surrounded by another material for ensuring that the sensor interrogation signal does not escape from the waveguide. In an embodiment, the waveguide may be an optical fiber. At the sensor, the waveguide may be exposed to allow coupling of the sensor interrogation signal into the waveguide resonator. The sensor interrogation signal(s) may then be coupled into the waveguide resonator by an evanescent field of the sensor interrogation signal(s) being coupled into the waveguide resonator in dependence of how well the frequency of the interrogation signal(s) correspond to the optical resonance frequency of the waveguide resonator.

According to an embodiment, the detector is a photo-sensitive element configured to detect an intensity of incident light on the photo-sensitive element.

The detector comprising a photo-sensitive element may provide a simple and inexpensive manner of detecting the first and second sensor interrogation signals.

Detectors may further be configured to detect phase information of the sensor interrogation signal(s). If the sensors are configured to modulate only one of the interrogation signals, a phase difference between the first sensor interrogation signal and the second sensor interrogation signal may be induced by the modulation, which may be detected by detectors. This may be useful in further analysis of the measurand.

According to an embodiment, the detector is configured to generate an electrical signal being representative of the intensity of incident light.

Thus, the detector may provide an electrical signal, which facilitates further analysis using electric circuitry of the measurement signal generated by the detector.

For instance, the detector may be configured to output a voltage signal or a current signal.

According to a second aspect, there is provided a photo-acoustic imaging device comprising: the sensor device according to the first aspect, wherein each sensor of the plurality of sensors comprises an opto-mechanical element for receiving an acoustic wave forming the measurand, and wherein the opto-mechanical element is configured to be affected by the received acoustic wave so as to change the optical characteristic of the optical resonance element.

Effects and features of this second aspect are largely analogous to those described above in connection with the first aspect. Embodiments mentioned in relation to the first aspect are largely compatible with the second aspect.

The use of the sensor device in the photo-acoustic imaging device enables fast and simultaneous read-out of a plurality of sensors of the sensor device.

This implies that the photo-acoustic imaging device may be used, e.g., for real-time monitoring of an object using photo-acoustic imaging. Photo-acoustic imaging may involve using optical pulses to excite acoustic signals in a sample, such as a liquid, gas, solid, tissue. The acoustic signal may then be detected by the plurality of sensors for enabling imaging of the sample.

The photo-acoustic imaging device may use a large number of sensors, enabling imaging of the object with high resolution or imaging of a large size object, while the plurality of sensors may be read out simultaneously to allow fast updates of images of the object.

The photo-acoustic imaging device comprises opto-mechanical elements for receiving an acoustic wave, wherein the acoustic wave affects an optical characteristic of the optical resonance element such that the acoustic wave is detected.

The opto-mechanical elements may be implemented in various manners. For instance, the opto-mechanical elements may comprise a mechanical element that may be formed by membranes, such that each sensor comprises a membrane for receiving an acoustic wave forming the measurand, wherein the membrane is configured to vibrate in dependence of the received acoustic wave, whereby an optical characteristic of the optical resonance element arranged on or in the vicinity of the membrane may be affected. According to an alternative, the opto-mechanical element may comprise a disk configured to bend upon receiving an acoustic wave or a Fabry-Pérot sensor oriented towards an object to be imaged.

The sensor device may alternatively be used for ultrasound imaging of an object, where acoustic pulses may be emitted into a sample and reflections of the acoustic pulses may be detected by the plurality of sensors.

According to a third aspect, there is provided a method for detecting a measurand, said method comprising: receiving, by a plurality of sensors, at least one of a first and a second sensor interrogation signals, wherein the first sensor interrogation signal comprises a first frequency comb of first frequencies defining a plurality of first signal components being separated by a first repetition frequency, wherein the second sensor interrogation signal comprises a second frequency comb of second frequencies defining a plurality of second signal components being separated by a second repetition frequency different from the first repetition frequency, wherein each of the plurality of first signal components is associated with a respective one of the plurality of second signal components to form a plurality of signal component pairs, wherein a difference in frequency between the associated first signal component and second signal component is different for different signal component pairs; modulating, by each sensor, the at least one of the first and second sensor interrogation signal by the measurand, wherein each sensor comprises an optical resonance element having a mutually unique optical resonance frequency and wherein an optical resonance of the optical resonance element of each sensor is associated with one, mutually unique, signal component pair of the plurality of signal component pairs, wherein each sensor modulates an optical intensity and/or phase of at least one of the associated first signal component and second signal component of the mutually unique signal component pair; receiving, by a detector, the first sensor interrogation signal and the second sensor interrogation signal, at least one of which being modulated by the plurality of sensors being affected by the measurand, and detecting, by the detector, a plurality of beat frequencies corresponding to mutually unique differences in frequency between the associated first signal component and second signal component for different signal component pairs for detecting a plurality of measurements by the plurality of sensors.

Effects and features of this third aspect are largely analogous to those described above in connection with the first and second aspects. Embodiments mentioned in relation to the first and second aspects are largely compatible with the third aspect.

The method allows simultaneous read-out of information of a measurand as sensed by a plurality of sensors, wherein the information relating to different sensors may be easily discriminated.

The method allows an efficient multiplexing scheme for multiplexing information sensed by the plurality of sensors. It should be realized that the multiplexing scheme could be combined with other multiplexing schemes, such as time or wavelength multiplexing.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

FIGS. 3a-b are schematic representations illustrating frequency content of first and second sensor interrogation signals.

FIGS. 4a-b are schematic representations illustrating Fourier transform of a measurand signal measured by a single sensor and Fourier transform of a measurement signal acquired by a detector based on the single sensor measuring the measurand signal.

FIGS. 5a-b are schematic representations illustrating Fourier transform of measurand signals measured by two sensors and Fourier transform of a measurement signal acquired by a detector based on the two sensors being affected by the measurand signals.

DETAILED DESCRIPTION

Figure 1:
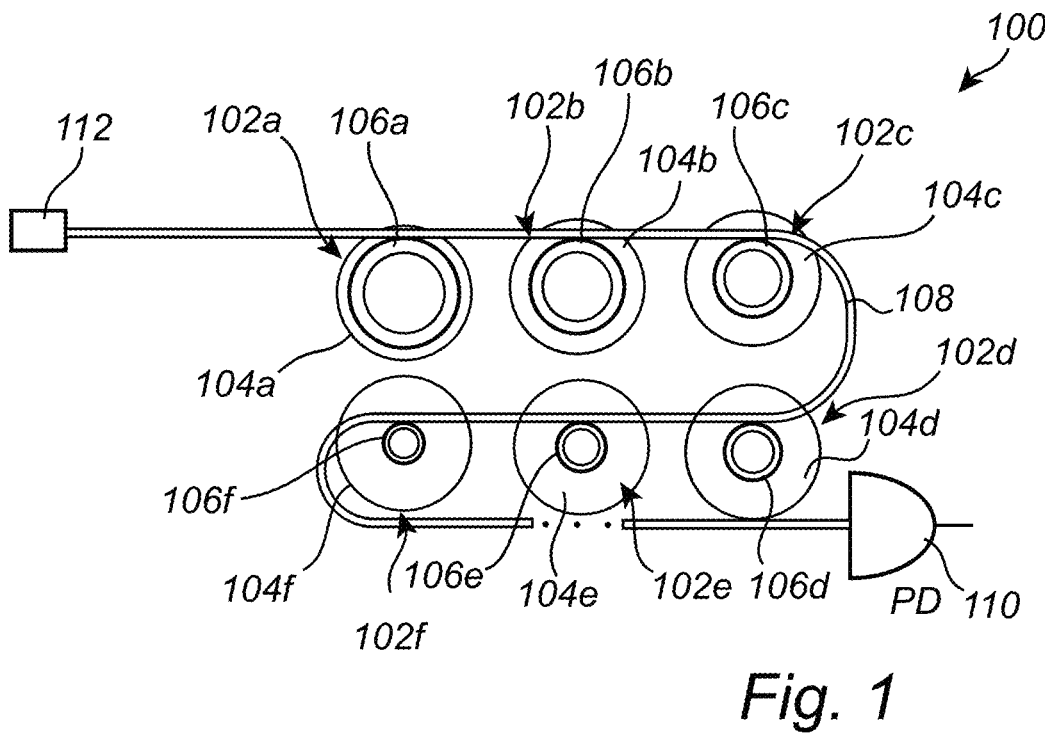
FIG. 1 is a schematic view of a sensor device according to an embodiment.

Referring now to FIG. 1, a sensor device 100 according to an embodiment will be described. The sensor device 100 comprises a plurality of sensors 102a-f configured to sense a measurand, such that the plurality of sensors 102a-f may be affected by the measurand so as to allow the measurand to be measured and quantified.

The sensor device 100 may be used in a photo-acoustic imaging device. The plurality of sensors 102a-f may then each comprise a membrane 104a-f for receiving an acoustic pressure wave. The membrane 104a-f may be deformed by the acoustic pressure wave. For instance, the membrane 104a-f may be configured to vibrate in dependence of the acoustic pressure wave being incident on the membrane 104a-f. The acoustic pressure wave may thus cause a change to an optical resonance frequency of an optical resonance element arranged on the membrane 104a-f of the sensor 102a-f. Alternatively, the optical resonance element may be arranged in vicinity of the membrane 104a-f so that it is optically and/or mechanically coupled to the membrane 104a-f.

The photo-acoustic imaging device may allow imaging of a large object and/or accurate imaging of an object based on the photo-acoustic imaging device comprising a large number of sensors 102a-f. As will be described below, the sensor device 100 allows simultaneous read-out of measurements of the measurand, such as an acoustic pressure wave, from the plurality of sensors, while the sensor device 100 comprises few components for performing the read-out.

The photo-acoustic imaging device may for instance be used for imaging of living tissue, wherein an optical pulse is emitted into the living tissue to excite an acoustic signal in the living tissue, which may then be detected by the sensor device 100. Thanks to the sensor device 100 allowing simultaneous read-out of a large number of sensors 102a-f, the photo-acoustic imaging device may be attractive to use in real-time imaging applications.

The photo-acoustic imaging device may be configured to sense high frequency signals using highly sensitive microphones, based on the membranes 104a-f of the sensors 102a-f. The photo-acoustic imaging device may be configured to record multiple pressure time traces, which may be used to reconstruct the image of an object located in opaque media. This may be very useful in various biosensing and medicine applications. Increasing the number of sensors increases the resolution, the distance and the object sizes that can be recorded.

It should be realized that the sensor device 100 may be used in various applications, wherein a measurand is sensed by the plurality of sensors 102a-f. The sensor device 100 may be used for sensing, e.g., pressure, temperature, force, or stiffness. The sensor device 100 may also or alternatively be used for sensing an object, such as sensing a chemical or biological substance or sensing a mass.

According to an embodiment, the sensor device 100 is used sensing based on optomechanical mass detectors. To this end, multiple mass landing events are recorded from highly sensitive and high frequency optomechanical mass sensors, to maximize a capture cross section of the sensor device 100. This is particularly useful in biosensing and spectroscopy applications. Increasing the number of sensors decreases measurement time and a required quantity of analyte. In addition, a large number of sensors enables acquiring of spatial mapping of the mass landing events. Like the photo-acoustic imaging device, optomechanical mass detectors may make use of membranes 104a-f on which mass landing events occur.

Below, the sensors 102a-f will be described based on comprising an optical resonance element 106a-f arranged on or in vicinity of the membrane 104a-f, wherein the membrane 104a-f may be affected by the measurand so as to affect an optical characteristic of the optical resonance element 106a-f. However, it should be realized that the sensors 102a-f do not need to comprise a membrane. Rather, an optical resonance element 106a-f may be arranged in other ways in order to be affected by a measurand.

For instance, the measurand being incident on the sensor 102a-f may be configured to affect a physical length of the optical resonance element 106a-f. However, the measurand may alternatively be configured to affect a refractive index of the optical resonance element 106a-f or of surroundings to the optical resonance element 106a-f, e.g., based on the measurand being an object entered into a path of the optical resonance element 106a-f. The measurand may in this way affect the optical resonance frequency of the optical resonance element 106a-f. However, it should be realized that the measurand may alternatively directly affect transmission, reflection, absorption or scattering of the optical resonance element 106a-f.

As shown in FIG. 1, each sensor 102a-f comprises an optical resonance element 106a-f. The optical resonance element 106a-f is arranged on or in vicinity of the membrane 104a-f and defines an optical path forming a loop within the optical resonance element 106a-f. An optical path length of the loop therefore defines an optical resonance frequency of the optical resonance element 106a-f corresponding to an integer number of periods of the optical resonance wavelength matching the optical path length of the optical resonance element 106a-f.

The optical resonance element 106a-f may for instance be formed as an optical waveguide resonator defining the optical path.

Thanks to the optical resonance element 106a-f being arranged on or in vicinity of the membrane 104a-f, any deformation of the membrane 104a-f by the measurand may cause the optical resonance element 106a-f to also be deformed or may change optical properties of the optical resonance element 106a-f optically and/or mechanically coupled to the membrane 104a-f so as to change the optical path length of the optical resonance element 106a-f. This implies that the optical resonance frequency will be changed by the measurand.

The optical resonance elements 106a-f may be configured such that the optical resonance frequencies is different for different optical resonance elements 106a-f. Each sensor 102a-f may thus be configured with a mutually unique optical resonance frequency.

For instance, when using an optical resonance element 106a-f forming a loop, such as using a ring resonator, a length of the optical path through the loop may be varied between different optical resonance elements 106a-f. For ring resonators, a diameter of the ring may be different between different optical resonance elements 106a-f such that each sensor 102a-f is provided with a unique diameter of the ring. It should of course be realized that the loop of the optical resonance element 106a-f may be arranged in a different shape than a ring.

A difference in optical resonance frequency between different sensors 102a-f may be sufficiently large such that there is no overlap between optical modes of different sensors 102a-f. Thus, a frequency may be uniquely associated with a single sensor 102a-f.

The sensor device 100 makes use of a first sensor interrogation signal and a second sensor interrogation signal. The sensor device 100 is configured such that at least one of the first sensor interrogation signal or the second sensor interrogation signal may be modulated by a sensor 102a-f for transferring an effect of the measurand affecting the sensor 102a-f to the modulated sensor interrogation signal, such that the modulated sensor interrogation signal carries information of the measurand as sensed by the sensor 102a-f.

The first sensor interrogation signal comprises a first optical frequency comb of first frequencies defining a plurality of first signal components being separated by a first repetition frequency, and the second sensor interrogation signal comprises a second optical frequency comb of second frequencies defining a plurality of second signal components being separated by a second repetition frequency different from the first repetition frequency. Each of a plurality of first signal components is associated with a respective one of a plurality of second signal components to form a plurality of signal component pairs. Thanks to the first repetition frequency being different from the second repetition frequency, a difference in frequency between the associated first signal component and second signal component is different for different signal component pairs.

Thanks to the optical resonance frequency between different sensors 102a-f being separated, the optical resonance frequency of the optical resonance element 106a-f of different sensors 102a-f are associated with different signal component pairs. The optical resonance element 106a-f of each sensor 102a-f is associated with one, mutually unique, signal component pair of the plurality of signal component pairs. This implies that even though the sensor interrogation signals comprise a plurality of signal components, each sensor 102a-f will only affect one signal component pair. For instance, a frequency offset, i.e., a difference in frequency between signal component pairs may be larger than an optical mode of the optical resonance elements 106a-f. Thus, each sensor 102a-f will only affect one signal component pair.

The first and/or second sensor interrogation signals may be coupled into a waveguide 108 and may be guided by the waveguide 108 past the optical resonance elements 106a-f in form of ring resonators. When passing the optical resonance element 106a-f, part of the optical signal of the first and/or second sensor interrogation signals may be coupled into the ring resonator, e.g., by coupling of the evanescent field of the sensor interrogation signal(s), propagating in the waveguide 108, into the ring resonator. Consequently, an intensity of the sensor interrogation signal(s) propagating past the ring resonator will depend on the correspondence between the frequency of the signal component(s) of the sensor interrogation signal(s) and the optical resonance frequency of the ring resonator. Only the intensity of the first signal component and/or the second signal component of the signal component pair with which the optical resonance element 106a-f is associated will be affected, since the frequencies of the other signal component pairs do not correspond to optical modes of the optical resonance element 106a-f of the sensor 102a-f.

Since only an intensity of a particular signal component/ signal components of a signal component pair of the sensor interrogation signal(s) is affected by each sensor 102a-f, the sensor interrogation signal(s) may be guided in the waveguide 108 past all of the sensors 102a-f, such that the sensor interrogation signal(s) having passed all sensor 102a-f carries information of the measurand as sensed by each of the sensors 102a-f.

The sensor device 100 further comprises a detector 110, which may be configured to receive the first sensor interrogation signal and the second interrogation signal, at least one of which having propagated past the optical resonance elements 106a-f of the sensors 102a-f. The detector 110 may thus be in the form of one or several photo-sensitive elements for detecting the first and second sensor interrogation signals. The detector 110 may be a photo diode, an imager or other type of optical detector.

The detector 110 may be arranged in the same housing or on the same carrier as the plurality of sensors 102a-f, such as being integrated directly on a common carrier with the plurality of sensors. Alternatively, the detector 110 may arranged separately from the plurality of sensors 102a-f and the detector 110 and may be configured to receive the first interrogation signal and the second interrogation signal.

A mechanism according to an embodiment for modulating of the sensor interrogation signal(s) by a measurand affecting a sensor 102a will now be described with reference to FIG. 2. The sensor 102a exhibits an optical resonance wherein a coupling efficiency of the sensor interrogation signal(s) into the optical resonance element 106a is dependent on frequency. Correspondingly, transmittance of the sensor interrogation signal(s) through the waveguide 108 is also dependent on frequency of the sensor interrogation signal(s), which is illustrated in FIG. 2.

The frequencies of the signal component pair with which the optical resonance element 106a is associated may be arranged at a flank of a resonance curve of the optical resonance element 106a. Thus, the frequencies of the signal component pair do not correspond exactly to peak optical resonance frequency of the optical resonance element 106a in an undeformed state of the membrane 104a (illustrated by solid line in FIG. 2).

Figure 2:
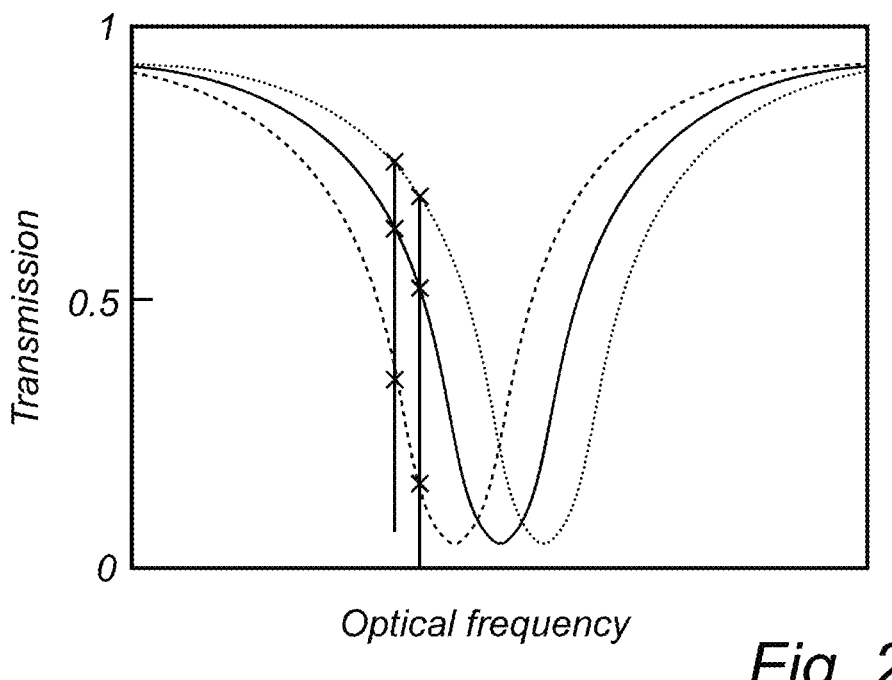
FIG. 2 is a graph illustrating transmittance of sensor interrogation signals based on optical resonance of a sensor being affected by a measurand.

In the graph of FIG. 2, the transmittance of the sensor interrogation signal(s) that would be measured by the detector 110 is illustrated. Three different resonance curves are illustrated for different resonance frequencies of the optical resonance element 106a. The resonance frequency (and corresponding dip in transmittance intensity) is shifted in dependence of e.g., a change of the geometry of the optical resonance element 106a and/or due to a change in material refractive indices of the optical resonance element 106a, based on the optical resonance element 106a being affected by the measurand.

The frequencies of the signal component pair associated with the optical resonance element are indicated by two straight lines in the graph of FIG. 2 and the transmission of the sensor interrogation signals is indicated by crosses and illustrates that, depending on the measurand affecting the sensor to change the optical resonance frequency of the optical resonance frequency element 106a, the transmission will change.

The center resonance curve (solid line) illustrates the optical resonance frequency of the optical resonance element 106a in the undeformed state of the membrane 104a of the sensor 102a. Since the measurement wavelength is selected to be arranged at a flank of the resonance curve, small changes in resonance frequency (illustrated by the dashed line resonance curve and dotted line resonance curve) due to acoustical pressure waves deforming the membrane 104a of the sensor 102a will change the optical intensity of the sensor interrogation signals being transmitted towards the detector 110. Thus, a shift of the resonance curve directly translates into a modulation of the transmitted optical intensity, which is hence used for detecting the acoustical pressure wave by the detector 110.

It should be realized that coupling of the sensor interrogation signal(s) to the optical resonance elements 106a-f may be achieved in other manners and not necessarily through a waveguide 108 being arranged to pass the optical resonance elements 106a-f. For instance, the sensor interrogation signal(s) may be guided through the optical resonance elements 106a-f.

Referring again to FIG. 1, the sensor device 100 may further comprise at least one source 112 configured to generate the first optical frequency comb and the second optical frequency comb of the first sensor interrogation signal and the second sensor interrogation signal, respectively. The at least one source 112 may comprise a single source forming a dual comb source but may alternatively comprise two separate sources configured to generate the first optical frequency comb and the second optical frequency comb, respectively.

The at least one source 112 may comprise at least one light source, such as at least one laser configured to generate an optical frequency comb, such as at least one mode-locked laser, at least one micro-ring resonator pumped by a monochromatic laser to generate solitons, or at least one monochromatic laser with output modulated by one or more electro-optic modulators.

The at least one source 112 may be arranged in the same housing or on the same carrier as the plurality of sensors 102a-f and the detector 110, such as being integrated directly on a common carrier with the plurality of sensors. Alternatively, the first and the second sensor interrogation signals may be received from at least one source 112 arranged separately from the plurality of sensors 102a-f and the detector 110.

Due to the periodicity of the optical frequency combs in the frequency domain, the frequencies in the first and second optical frequency combs may be described by offset frequencies $$f_0^A \text{ and } f_0^B$$

and with repetition frequencies $$f_{rep}^A$$

and $$f_{rep}^B,$$

as represented in FIG. 3a. The repetition frequencies $$f_{rep}^A$$

and $$f_{rep}^B$$

correspond to a spacing between two successive comb lines for the first and the second optical frequency comb, respectively. Such successive comb lines form a signal component pair comprising a first frequency of the first optical frequency comb and a second frequency of the second optical frequency comb. A difference in repetition frequency within the signal component pair may be denoted $$\Delta f_{rep} = f_{rep}^B - f_{rep}^A,$$

where the difference is much smaller than the respective repetition frequencies, $$f_{rep}^A, f_{rep}^B.$$

For simplicity, the frequencies of the first and second optical frequency combs are assumed to overlap at a given frequency, and the successive frequency components are considered to form the signal component pairs associated with the plurality of sensors 102a-f. This implies that the differences in frequency between the frequencies in a signal component pair are multiples of $\Delta f_{rep}$ as indicated in FIG. 3b. If the frequencies of the first and second optical frequency combs would not overlap, the differences in frequency between the frequencies in a signal component pair would also involve an offset value.

When the sensor interrogation signals are received by the detector 110 measuring the total optical intensity, the spectral components of the two optical frequency combs interfere, or beat, resulting in an electronic radio frequency spectrum exhibiting beat frequencies corresponding to the difference in frequency between the first and second frequencies in the respective signal component pairs. Hence, the detector 110 may generate an electrical signal comprising multiple components modulated at beat frequencies $$f_{mod}^k = k \times \Delta f_{rep},$$

where k is an integer number and N sensors 102a-f are associated with integer numbers k=1 to N or k=x to x+N, where x is any integer value.

Since the beat frequency is different for different signal component pairs and different signal component pairs are associated with different sensors 102a-f, the information of the measurand corresponding to measurement made by separate sensors 102a-f is separated to different beat frequencies.

The sensors 102a-f may be configured to generate a time-varying modulation of the at least one of the first and second sensor interrogation signal by receiving a time-varying measurand signal. This implies that the beat frequencies may be associated with a time-varying measurand signal generating the modulation of the sensor interrogation signals.

The optical resonance elements 106a-f of the plurality of sensors 102a-f may be designed such that the optical resonance elements 106a-f are associated with mutually unique signal component pairs defined by the first and second sensor interrogation signals. Hence, sensor k can be identified by one of its resonance wavelengths $\lambda_k$ corresponding to the frequency of the signal component pair with which the sensor is associated. The sensor k is characterized by a complex transmission $tr_k(\lambda)$, so that a transmitted complex electrical field $E^{tr}(t)$ of the sensor interrogation signal by the sensor k is given by $E^{tr}(t)=tr_k(\lambda_0) \times E_0(t)$, where $E_0(t)=E_0 \times \exp(j(w\omega_0 t+\varphi_0))$ is the incident complex electric field at a wavelength $\lambda_0$, $E_0$ is the electric field amplitude, $\omega_0$ is the angular frequency and $\varphi_0$ is the phase. The transmitted and incident complex electrical fields are here considered as scalar fields, for simplicity.

As mentioned above, one or both of the sensor interrogation signals may be received by the sensors 102a-f. If both the sensor interrogation signals are received by the sensors 102a-f both the sensor interrogation signals are modulated by the sensors 102a-f. Each sensor 102a-f modulates only one signal component pair of the sensor interrogation signals, which may be referred to by a corresponding wavelength $\lambda_k$, with which the sensor 102a-f is associated.

With the assumption above that the frequencies of the first and second optical frequency combs are assumed to overlap at a given frequency, and the successive frequency components are considered to form the signal component pairs, a smallest angular frequency shift $\Delta\omega$ between the frequencies within a signal component pair coupled to the plurality of sensors 102a-f may be expressed as $\Delta\omega=2\pi\Delta f_{rep}=2\pi f_{mod}$, where the term $\Delta f_{rep}$ is substituted by $f_{mod}$ to simplify notations. The sensor k is associated with the angular frequency shift of the first and second frequencies of the signal component pair coupled to its optical resonance such that the angular frequency shift may be expressed as $$\Delta\omega_{mod}^k = 2\pi f_{mod}^k = k \times \Delta\omega = 2\pi k \times f_{mod},$$

where $$\Delta\omega_{mod}^k$$

is the angular frequency shift between the first and second frequencies of the signal component pair associated with sensor k, and $$f_{mod}^k$$

is the frequency shift between the first and second frequencies of the signal component pair associated with sensor k. Hence, it is possible to identify sensor k by a doublet $$(\lambda_k; f_{mod}^k).$$

Alternatively, only one of the sensor interrogation signals is received by the sensors 102a-f and the other of the sensor interrogation signals is directly transmitted to the detector 110, e.g., through free space, through an integrated photonic circuit or through optical fibers. Each sensor 102a-f modulates only one frequency of the sensor interrogation signals, which may be referred to by a corresponding wavelength $\lambda_k$, with which the sensor 102a-f is associated.

Again, the sensor k is associated with the angular frequency shift of the first and second frequencies of the frequency pair coupled to its optical resonance such that the angular frequency shift as acquired by the detector receiving the first and second sensor interrogation signals may be expressed as $$\Delta\omega_{mod}^k = 2\pi f_{mod}^k = k \times \Delta\omega = 2\pi k \times f_{mod}.$$

Hence, it is possible to identify sensor k by the doublet $$(\lambda_k; f_{mod}^k).$$

Each sensor 102a-f senses the measurand x and the variation in time of the measurand as sensed by sensor k is denoted $x_k(t)$. The measurand affects the optical characteristic of the optical resonance elements 106a-f, as described above.

It may be assumed that an effect by the measurand on optical properties of the optical resonance elements 106a-f is small. The effect of the measurand on the complex optical transmission $tr_k(\lambda)$ at a wavelength $\lambda_0$ may be expressed as: $tr_k(\lambda_0, t) = tr_k(\lambda_0) + \alpha_k \times x_k(t)$, where $$\alpha_k(\lambda_0) = \frac{dtr_k(\lambda_0)}{dx}.$$

Now, the total transmitted electric field for one sensors 102a will be discussed. For simplicity, label k of the sensor 102a is omitted. First, the total transmitted electric field for the sensor 102a receiving both the first and the second sensor interrogation signal is considered. In this case, the first and the second frequency of the signal component pair are coupled to the considered ring resonator, with wavelengths $\lambda_A$ and $\lambda_B$ coming from the first optical frequency comb and the second optical frequency comb, respectively. The total transmitted electric field is given by:

$$E^{trans}(t) = tr(\lambda_A, t) \times E_A(\lambda_A, t) + tr(\lambda_B, t) \times E_B(\lambda_B, t),$$

where $E_A(\lambda_A, t)$ and $E_B(\lambda_B, t)$ correspond to the incident complex electric fields components originating from the first optical frequency comb and the second optical frequency comb that are coupled to the sensor 102a, respectively. Further, the angular frequency shift for the first and second frequencies of the signal component pair is given by $\Delta\omega_{mod}=\omega_A-\omega_B=2\pi f_{mod}$ and the phase difference between the frequencies is $\Delta\varphi_{mod}=\varphi_A-\varphi_B$.

The transmitted intensity may be determined using the following approximations. The amplitude of the electric fields components $E_A \approx E_B = E_0$ and hence both components have the same intensity $|E_A|^2 \approx |E_B|^2 = I_0$, and $tr(\lambda_A) \approx tr(\lambda_B) = tr_0$, where these terms are the complex valued electric field ring transmission. Further, $\alpha(\lambda_A) \approx \alpha(\lambda_B) = \alpha_0$ are the corresponding derivatives $$\alpha(\lambda) = \frac{dtr(\lambda)}{dx}$$

and $|tr_0|^2 = T_0$ is the intensity transmission.

Second, the total transmitted electric field for the sensor 102a receiving only the first sensor interrogation signal is considered. In this case, only the first frequency of the first optical frequency comb is coupled to the considered ring resonator, while the second optical frequency comb is directly sent to the detector 110. Hence, the total electric field at the detector 110 is given by:

$$E^{trans}(t) = tr(\lambda_A, t) \times E_A(\lambda_A, t) + E_B(\lambda_B, t).$$

Further, the angular frequency shift for the first and second frequencies of the signal component pair is given by $\Delta\omega_{mod}=\omega_A-\omega_B=2\pi f_{mod}$ and the phase difference between the frequencies is $\Delta\varphi_{mod}=\varphi_A-\varphi_B$.

The transmitted intensity may be determined using the following approximations. The amplitudes of the electric field components $E_A \approx E_B = E_0$ and hence both components have the same intensity $I_0$.

In both cases, regardless whether the sensor 102a is configured to receive one or two interrogation signals, a total optical intensity signal, being modulus square of the total electric field, is measured by the detector 110, which may for instance be a photodiode. The photodiode has a conversion gain G of the measured voltage so that a voltage signal $V^{PD}(t)$ from the photodiode may be expressed as $V^{PD}(t) = G \times I^{trans}$, where $I^{trans} = |E^{trans}(t)|^2$ is the optical intensity at the photodiode. It should be realized that another signal may be generated by the detector, such as a current signal. However, using the voltage signal with gain G, for both cases, the measured voltage can be expressed in the form:

$$V^{PD}(t) =$$

$$K + L \times \cos[\omega_{mod} \times t + \varphi_{mod1}] + M \times x(t) + P \times x(t) \times \cos[\omega_{mod} \times t + \varphi_{mod2}]$$

In the above expression, constants {K; L; M; P} are introduced, as well as $\omega_{mod}$, $\varphi_{mod1}$, and $\varphi_{mod2}$ parameters, which depend on whether the first or the second case is used. The values of these constants and parameters are summarized below:

For the first case (both the first and the second sensor interrogation signals are coupled to the sensor 102a), the following constants apply:

$$K = G \times 2T_0 I_0$$

$$L = G \times 2T_0 I_0$$

$$M = \frac{2\mathrm{Re}(\alpha_0 \times tr_0)}{T_0} G \times 2T_0 I_0$$

$$P = \frac{2\mathrm{Re}(\alpha_0 tr_0*)}{T_0} G \times 2T_0 I_0.$$

Further, the following amplitude and phase terms apply:

$\omega_{mod}=\Delta\omega_{mod}$, the angular frequency difference between the first and second frequencies of the signal component pair, $\varphi_{mod1}=\Delta\varphi_{mod}$, the phase difference between the first and second frequencies of the signal component pair, and $\varphi_{mod2}=\Delta\varphi_{mod}$, the phase difference between the first and second frequencies of the signal component pair.

For the second case (only the first sensor interrogation signal is coupled to the sensor 102a), the following constants apply:

$$K = G \times I_0 \times (T(\lambda_A) + 1)$$

$$L = G \times 2I_0 E$$

$$M = G \times I_0 \times E \times H \times \cos[F + K]$$

$$P = G \times I_0 \times 2H.$$

Further, the following amplitude and phase terms apply:

$\omega_{mod}=\Delta\omega_{mod}$, the angular frequency difference between the first and second frequencies of the signal component pair, $\varphi_{mod1}=\Delta\varphi_{mod}+F$, the phase difference between the first and second frequencies of the signal component pair+F, the phase of $tr(\lambda_A)$, and $\varphi_{mod2}=\Delta\varphi_{mod}+K$, the phase difference between the first and second frequencies of the signal component pair+K, the phase of $\alpha'^A$.

The parameters introduced in the expressions above are specified below:

G: gain of photodiode, $I_0$: intensity of the two spectral components of the first frequency and the second frequency $|E_A|^2 \approx |E_B|^2 = I_0$, $T_0$: in case of a small wavelength difference between $\lambda_A$ and $\lambda_B$, the two spectral components of the first frequency and the second frequency, $T(\lambda_A) \approx T(\lambda_B) = T_0$ is an average intensity transmission, $\alpha_0*$: in case of a small wavelength difference between $\lambda_A$ and $\lambda_B$, the two spectral components of the first frequency and the second frequency, $$\alpha'^A = \frac{dtr(\lambda_A)}{dx} \approx \alpha'^B = \frac{dtr(\lambda_B)}{dx} = \alpha_0$$

is an average variation of the complex transmission for a displacement dx, where * correspond to the complex conjugate, $tr_0$: in case of a small wavelength difference between $\lambda_A$ and $\lambda_B$, the two spectral components of the first frequency and the second frequency, $tr(\lambda_A) \approx tr(\lambda_B) = tr_0$ is an average complex transmission, where * correspond to the complex conjugate, $T(\lambda_A)$: intensity transmission at excitation wavelength $\lambda_A$ for the spectral component of the first frequency that is coupled to the sensor, {E, F}: $tr(\lambda_A) = E \times \exp(iF)$, where E and F are the amplitude and phase of the complex transmission, respectively, at the excitation wavelength $\lambda_A$ for the spectral component of the first frequency that is coupled to the sensor,

{H, K}:

$$a'^A = \frac{dtr(\lambda_A)}{dx} = H \times \exp(iK)$$

where H and K are the amplitude and phase of the complex transmission, respectively, at the excitation wavelength $\lambda_A$ for the spectral component of the first frequency that is coupled to the sensor.

In the expression of the voltage signal $V^{PD}(t)$ from the photodiode, the third term, that is, the $P \times x(t) \times \cos[\omega_{mod} \times t + \varphi_{mod2}]$ term is the term of particular interest, as it corresponds to the measurand time trace x(t) that it is intended to measure multiplied by a $\cos[\omega_{mod} \times t + \varphi_{mod2}]$ term, that is, modulated at the frequency $\omega_{mod} = \Delta\omega_{mod} = 2\pi f_{mod}$, which corresponds to the angular frequency shift of the first and second frequencies of the signal component pair.

The voltage signal $V^{PD}(t)$ from the photodiode can also be represented in terms of spectral decomposition. To this end, the Fourier Transform $\widehat{V^{PD}(f)}$ of $V^{PD}(t)$. The Fourier transform is given by:

$$\widehat{V^{PD}(f)} = K \times \delta(f) + M \times \widehat{x(f)} + L \times \frac{\delta(f - f_{mod}) \times e^{i\varphi_{mod1}} + \delta(f + f_{mod})e^{-i\varphi_{mod1}}}{2} + P \times \frac{\widehat{x(f - f_{mod})}e^{i\varphi_{mod2}} + \widehat{x(f + f_{mod})}e^{-i\varphi_{mod2}}}{2},$$

where the hat symbols indicate the Fourier Transform of the considered quantity, whereas $\delta(f)$ corresponds to the Dirac distribution and $\omega_{mod} = 2\pi f_{mod}$. The spectral decomposition can be represented schematically as shown in FIGS. 4a-b.

FIG. 4a is a schematic representation of $\widehat{x(f)}$, the Fourier transform of x(t). This Fourier transform function is complex valued. The dashed and dotted areas indicate that, since x(t) is real, the negative components of $\widehat{x(f)}$ are the complex conjugate of the positive ones. The term $x_c$ represents a cutoff frequency of x(t).

FIG. 4b is a schematic representation of the different components of $\widehat{V^{PD}(f)}$ for a single sensor. The vertical lines between the dashed and dotted areas represent the Dirac distributions. In FIG. 4b, the different coefficients in front of the different components of the Fourier Transform are visible.

Now, the case of plurality of sensors 102*a-f* simultaneously addressed with the first and second sensor interrogation signals will be discussed. All the optical signals may be measured by the same photodiode. At the photodiode, the total electrical field can be written as:

$$E_{tot}(t) = E_{ring1}^{trans}(t) + E_{ring2}^{trans}(t) + \ldots = \sum_{k=1}^{N} E_{ringk}^{trans}(t)$$

Here, the electrical field is indicated to originate from different ring resonators, but it should be realized that other optical resonance elements may be used. The optical ring resonators are configured with optical resonance wavelengths that are spaced by few nanometers, that is, few hundreds of GHz in frequency, which is much higher than the beat frequencies $$\Delta \omega_{mod}^{k}$$

considered, which are in the range of hundreds of MHz. Therefore, when calculating the total intensity measured by the photodiode, only the beating terms between the spectral components separated by $$\Delta \omega_{mod}^{k}$$

are considered, other beating components are at much higher frequencies and can therefore be neglected (i.e., rejected by the frequency bandwidth of the photodiode). Hence, the total intensity $I_{tot}(t)$ may be expressed as:

$$I_{tot}(t) = I_{ring1}^{trans}(t) + I_{ring2}^{trans}(t) + \ldots = \sum_{k=1}^{N} I_{ringk}^{trans}(t).$$

Therefore, by extending the reasoning carried out on a single ring, the voltage signal may be expressed as:

$$V^{PD}(t) = \sum_{k=1}^{N} V^{PD\ ringk}(t),$$

where, $$V^{PD\ ringk}(t) = K^{k} + L^{k} \times \cos\left[\omega_{mod}^{k} \times t + \varphi_{mod1}^{k}\right] +$$
$$M^{k} \times x^{k}(t) + P^{k} \times x^{k}(t) \times \cos\left[\omega_{mod}^{k} \times t + \varphi_{mod2}^{k}\right],$$

and where the superscript k indicates and where the k superscript indicates the terms related to the $k^{th}$ sensor. In particular, the term $x^{k}(t)$ corresponds to the time trace x(t) of the measurand, as measured by the $k^{th}$ sensor, whereas $$\omega_{mod}^{k} = 2\pi f_{mod}^{k} = k \times \Delta\omega = 2\pi k \times f_{mod} = 2\pi k \times f_{rep},$$

since the modulation frequency $f_{mod}$ corresponds to the difference in repetition frequency $\Delta f_{rep}$ between the first and second optical frequency combs. As before, we can calculate the Fourier Transform of the voltage measured by the photodiode:

$$\widehat{V^{PD}}(f) = \sum_{k=1}^{N} \widehat{V^{PD\ ringk}}(f)$$

with $$\widehat{V^{PD\ ringk}}(f) =$$
$$K^{k} \times \delta(f) + M^{k} \times \widehat{x^{k}}(f) + L^{k} \times \frac{\delta\left(f - f_{mod}^{k}\right) \times e^{i\varphi_{mod1}^{k}} + \delta\left(f + f_{mod}^{k}\right)e^{-i\varphi_{mod1}^{k}}}{2} +$$
$$P^{k} \times \frac{\widehat{x^{k}}\left(f - f_{mod}^{k}\right)e^{i\varphi_{mod2}^{k}} + \widehat{x^{k}}\left(f + f_{mod}^{k}\right)e^{-i\varphi_{mod2}^{k}}}{2}.$$

This spectral decomposition can be represented graphically for two sensors, that we call sensor m and sensor p, wherein $$f_{mod}^{m} = m \times f_{mod}$$

and $$f_{mod}^{p} = p \times f_{mod}.$$

The superscripts m and p indicate the terms related to sensors m and p, respectively.

FIG. 5*a* is a schematic representation of $\widehat{x^{m}}(f)$ and $\widehat{x^{p}}(f)$, the Fourier transform of the signals $x^{m}(t)$ and $x^{p}(t)$ measured by sensor m and sensor p. The term $x_{c}$ represents a common cutoff frequency of the signals $x^{m}(t)$ and $x^{p}(t)$. The dashed and dotted areas indicate that, since the measured time traces are real-value signals, the negative components of $\widehat{x(f)}$ are the complex conjugate of the positive ones.

FIG. 5*b* is a schematic representation of the different components of $\widehat{V^{PD}}(f)$ for the two addressed sensors m and p. The vertical lines between the dashed and dotted areas represent the Dirac distributions. In FIG. 5*b*, the different coefficients in front of the different components of the Fourier Transform defined above are visible. The dashed and dotted rectangles indicate the spectral components related to sensor m and sensor p, and that are isolated from the other spectral components of the voltage signal measured by the photodiode.

The spectral components highlighted by dashed and dotted rectangles in FIG. 5*b* comprise the components of the signals $x^{m}(t)$ and $x^{p}(t)$ measured by sensor m and sensor p, respectively, wherein the signals are shifted by $$\pm f_{mod}^{m}$$

and $$\pm f_{mod}^p,$$

respectively.

By choosing $f_{mod} > 2x_c$, these components are isolated from all the other components present in $\widehat{V^{PD}}(f)$. Hence, the difference in beat frequencies for different sensors may be larger than two times the cut-off frequency. This ensures that the beat frequencies associated with different sensors may be easily extracted.

In order to retrieve the time trace $x^m(t)$ of the measurand as measured by the $m^{th}$ sensor in the plurality of sensors 102a-f, the measured signal $$V^{PD}(t) = \sum_{k=1}^{n} V^{PD\ ring\ k}(t)$$

may be demodulated, that is multiplied with an oscillating function at a frequency $$\omega_{demod}^m = 2\pi f_{mod}^m = 2\pi \times m \times f_{mod} = 2\pi \times m \times \Delta f_{rep}.$$

The oscillating function may for instance be generated via an electronic oscillator. Therefore, the following demodulated signal is obtained:

$$V_{demod\ m}^{PD}(t) = V^{PD}(t) \times V_{demod}^m \cos(\omega_{demod}^m \times t + \varphi_{demod}^m) =$$

$$\sum_{k=1}^{N} V^{PD\ ring\ k}(t) \times V_{demod}^m \times \cos(\omega_{demod}^m \times \cos(\omega_{demod}^m \times t + \varphi_{demod}^m).$$

Hence, moving into the frequency domain by the Fourier Transform (and using the fact that $$f_{mod}^k = k \times f_{mod}),$$

the following expression is obtained:

$$\widehat{V_{demod\ m}^{PD}}(f) =$$

$$V_{demod}^m \times \sum_{k=1}^{N} K^k \times \frac{\delta(f - m \times f_{mod})e^{i\varphi_{demod}^m} + \delta(f + m \times f_{mod})e^{-i\varphi_{demod}^m}}{2} +$$

$$M^k \times \frac{\widehat{\gamma_k}(f - m \times f_{mod}) \times e^{i\varphi_{demod}^m} + \widehat{\gamma_k}(f + m \times f_{mod}) \times e^{-i\varphi_{demod}^m}}{2} +$$

$$L^k \times \frac{\delta(f - (k+m) \times f_{mod}) \times e^{i(\varphi_{mod1}^k + \varphi_{demod}^m)}}{4} +$$

$$L^k \times \frac{\delta(f + (m-k) \times f_{mod}) \times e^{i(\varphi_{mod}^k - \varphi_{demod}^m)}}{4} +$$

$$L^k \times \frac{\delta(f + (k-m) \times f_{mod}) \times e^{i(\varphi_{demod}^m - \varphi_{mod1}^k)}}{4} +$$

$$L^k \times \frac{\delta(f + (k+m) \times f_{mod}) \times e^{-i(\varphi_{demod}^m + \varphi_{mod1}^k)}}{4} +$$

-continued $$P^k \times \frac{\widehat{\gamma_k}(f - (k+m) \times f_{mod})e^{i(\varphi_{mod2}^k + \varphi_{demod}^m)}}{4} +$$

$$P^k \times \frac{\widehat{\gamma_k}(f + (m-k) \times f_{mod})e^{i(\varphi_{mod2}^k - \varphi_{demod}^m)}}{4} +$$

$$P^k \times \frac{\widehat{\gamma_k}(f + (k-m) \times f_{mod})e^{-i(\varphi_{mod2}^k + \varphi_{demod}^m)}}{4} +$$

$$P^k \times \frac{\widehat{\gamma_k}(f + (k+m) \times f_{mod})e^{-i(\varphi_{mod2}^k + \varphi_{demod}^m)}}{4}.$$

By choosing $f_{mod} > 2x_c$, there is no overlap between these terms of the demodulated signal. It is thus possible to filter this expression with a low pass filter selecting the components between $[-x_c;\ x_c]$. Hence, in the filtered signal $\widehat{V_{demod\ m\ filtered}^{PD}}(f)$ the following applies:

For $k \neq m$, since $f_{mod} > 2x_c$, all the components lie outside the $[-x_c;\ x_c]$ interval. Hence, these components are rejected by the filter.

For $k = m$ the components left after filtering are:

$$\widehat{V_{demod\ m\ filtered}^{PD}}(f) =$$

$$V_{demod}^m \times \left\{ L^m \times \frac{\delta(f) \times e^{i(\varphi_{mod}^m - \varphi_{demod}^m)}}{4} + L^m \times \frac{\delta(f) \times e^{i(\varphi_{demod}^m - \varphi_{mod1}^m)}}{4} + \right.$$

$$\left. P^m \times \frac{\widehat{\gamma_m}(f)e^{i(\varphi_{mod2}^m - \varphi_{demod}^m)}}{4} + P^m \times \frac{\widehat{\gamma_m}(f)e^{-i(\varphi_{mod2}^m - \varphi_{demod}^m)}}{4} \right\},$$

which may be written as:

$$\widehat{V_{demod\ m\ filtered}^{PD}}(f) =$$

$$V_{demod}^m \left\{ L^m \frac{\delta(f)\cos(\varphi_{mod1}^m - \varphi_{demod}^m)}{2} + P^m \frac{\widehat{\gamma_m}(f)\cos(\varphi_{mod2}^m - \varphi_{demod}^m)}{2} \right\}.$$

Therefore, if the DC components are also filtered out, the measured voltage time trace is given by:

$$V_{demod\ m\ filtered}^{PD}(t) = A^m \times x^m(t),$$

where $A^m = \frac{V_{demod}^m P^m \cos(\varphi_{mod2}^m - \varphi_{demod}^m)}{2}.$ Therefore, this demodulation at $$f_{mod}^m$$

and filtering process allows the signal $x^m(t)$ of sensor m to be retrieved.

Figure 6:
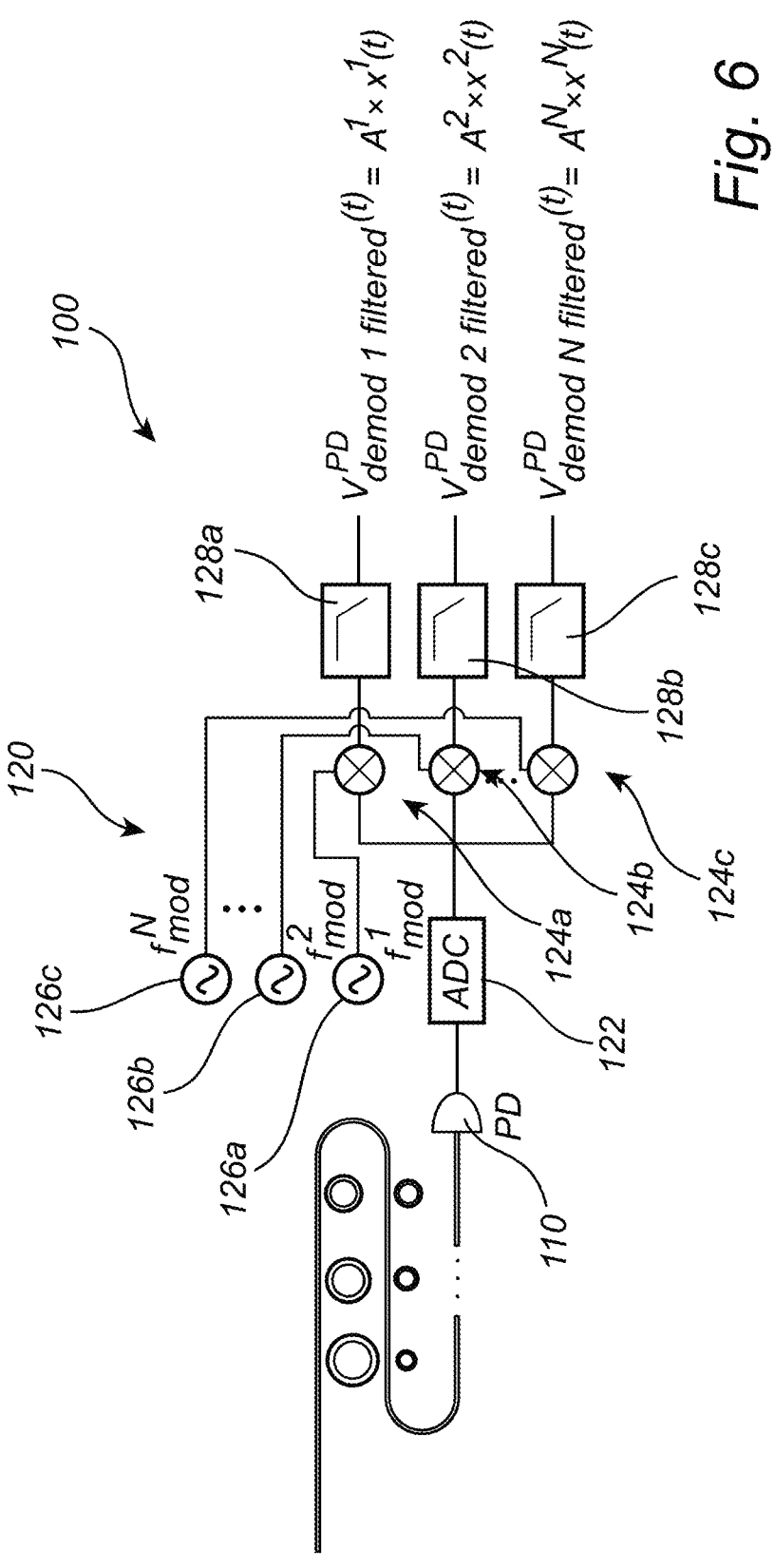
FIG. 6 is a schematic view of the sensor device illustrating read-out circuitry of the sensor device.

Referring now to FIG. 6, the sensor device 100 may further comprise read-out circuitry 120. The read-out circuitry 120 may be configured to receive a measurement signal from the detector 110. The read-out circuitry 120 may further be configured to separate signals corresponding to different beat frequencies for separate read-out of measurements by each sensor 102a-f. The separation of signals is indicated above.

In one embodiment, the measurement signal from the detector 110 may be received by an analog-to-digital converter (ADC) 122, which may form a digital representation of the measurement signal from the detector 110. This may facilitate further processing of the measurement signal by the read-out circuitry 120.

The read-out circuitry 120 may further comprise a plurality of parallel, separate read-out channels 124*a-c*. Each read-out channel 124*a-c* may be configured to demodulate the measurement signal using a demodulation signal having a frequency corresponding to the respective beat frequency, as discussed above.

As shown in FIG. 6, each read-out channel 124*a-c* may comprise an oscillator 126*a-c*. In read-out channel m, the oscillator is configured to oscillate at frequency $$f_{mod}^m$$

for demodulating the measurement signal. Each read-out channel 124*a-c* may further comprise a low-pass filter 128*a-c*, which may be configured to retrieve the time trace $x^m(t)$ of the measurand as measured by the sensor m and/or a band-pass filter which may be configured to retrieve the time trace $x^m(t)$ of the measurand and may further be configured to remove DC components of the measurement signal, as discussed above.

Figure 7:
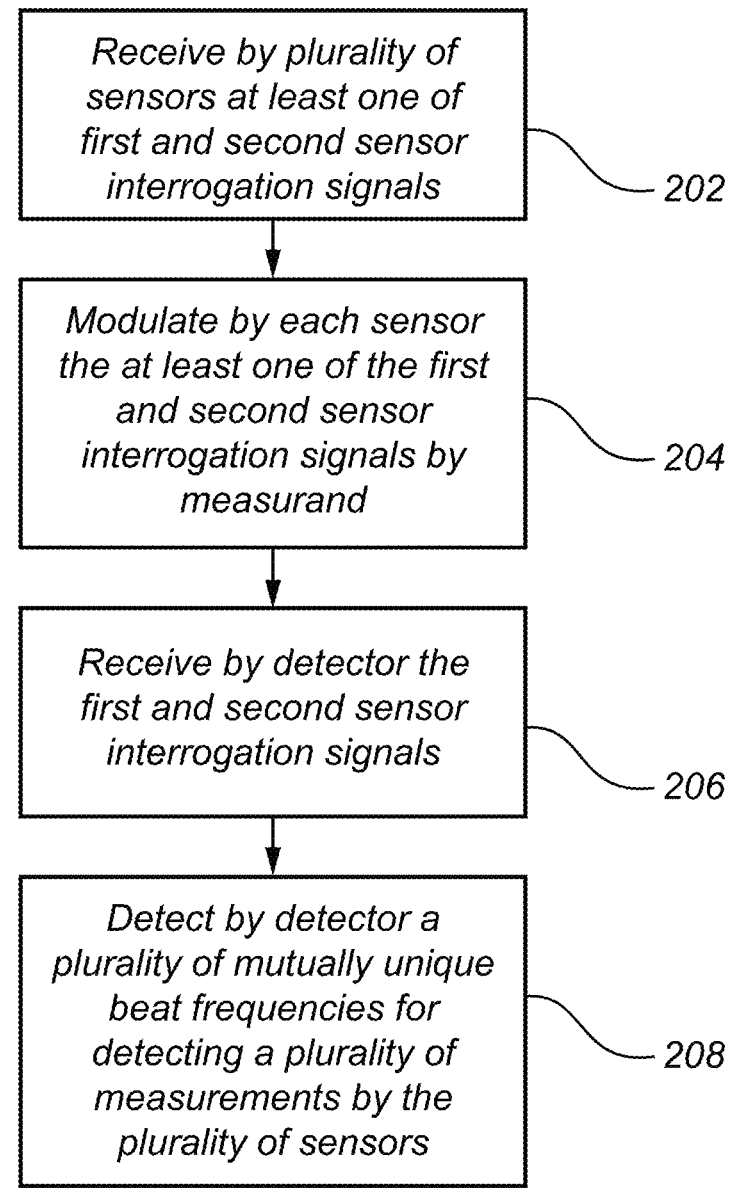
FIG. 7 is a flowchart of a method according to an embodiment.

Referring now to FIG. 7, a method for detecting a measurand will be described.

The method comprises receiving 202, by a plurality of sensors, at least one of a first and a second sensor interrogation signals, wherein the first sensor interrogation signal comprises a first optical frequency comb of first frequencies defining a plurality of first signal components being separated by a first repetition frequency, wherein the second sensor interrogation signal comprises a second optical frequency comb of second frequencies defining a plurality of second signal components being separated by a second repetition frequency different from the first repetition frequency. The first signal components are associated with respective second signal components to form a plurality of signal component pairs, wherein a difference in frequency between the associated first signal component and second signal component is different for different signal component pairs.

The method further comprises modulating 204, by each sensor, the at least one of the first and second sensor interrogation signal by the measurand. Each sensor comprises an optical resonance element having a mutually unique optical resonance frequency and an optical resonance of the optical resonance element of each sensor is associated with one, mutually unique, signal component pair of the plurality of signal component pairs. Each sensor modulates an optical intensity of at least one of the associated first signal component and second signal component of the mutually unique signal component pair. Thus, each sensor only modulates signal components of a single signal component pair and signal components of other signal component pairs are not affected by the sensor.

The method further comprises receiving 206, by a detector measuring a total optical intensity, the first sensor interrogation signal and the second sensor interrogation signal, at least one of which being modulated by the plurality of sensors being affected by the measurand.

The method further comprises detecting 208, by the detector, a plurality of beat frequencies corresponding to mutually unique differences in frequency between the associated first signal component and second signal component for different signal component pairs for detecting a plurality of measurements by the plurality of sensors. Thus, the method allows separate detection of the information of the measurand as sensed by different sensors. The detecting by the detector may be performed by a single photo-sensitive element while still allowing the information associated with different sensors to be extracted thanks to the sensors being associated with different beat frequencies.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A sensor device comprising:

a plurality of sensors, wherein each sensor comprises an optical resonance element, wherein an optical characteristic of the optical resonance element is configured to be affected by a measurand to be measured by the sensor and wherein each sensor in the plurality of sensors has a mutually unique optical resonance frequency;

the plurality of sensors being configured to receive at least one of a first and a second sensor interrogation signals, wherein the first sensor interrogation signal comprises a first optical frequency comb of first frequencies defining a plurality of first signal components being separated by a first repetition frequency, wherein the second sensor interrogation signal comprises a second optical frequency comb of second frequencies defining a plurality of second signal components being separated by a second repetition frequency different from the first repetition frequency, wherein each of the plurality of first signal components is associated with a respective one of the plurality of second signal components to form a plurality of signal component pairs, wherein a difference in frequency between the associated first signal component and second signal component is different for different signal component pairs;

wherein an optical resonance of the optical resonance element of each sensor is associated with one, mutually unique, signal component pair of the plurality of signal component pairs such that each sensor is configured to modulate the at least one of the first and second sensor interrogation signal by the measurand to modulate an optical intensity and/or phase of at least one of the associated first signal component and second signal component of the mutually unique signal component pair; and a detector, being configured to receive the first sensor interrogation signal and the second sensor interrogation signal, at least one of which being modulated by the plurality of sensors being affected by the measurand, wherein the detector is configured to detect a plurality of beat frequencies corresponding to mutually unique differences in frequency between the associated first signal component and second signal component for different signal component pairs for detecting a plurality of measurements by the plurality of sensors.

2. The sensor device according to claim 1, further comprising at least one source configured to generate the first optical frequency comb and the second optical frequency comb.

3. The sensor device according to claim 1, wherein a frequency offset between signal component pairs of the plurality of signal component pairs is larger than an optical mode bandwidth of the resonance elements of the sensors associated with the signal component pairs.

4. The sensor device according to claim 1, wherein a frequency offset between beat frequencies correspond to a difference between the first repetition frequency and the second repetition frequency and wherein the frequency offset between beat frequencies is larger than two times a cut-off frequency of sensitivity of the plurality of sensors.

5. The sensor device according to claim 1, further comprising read-out circuitry, which is configured to receive a measurement signal from the detector and is configured to separate signals corresponding to different beat frequencies for separate read-out of measurements by each sensor of the plurality of sensors.

6. The sensor device according to claim 5, wherein the read-out circuitry is configured to form separate signals in separate read-out channels, wherein each read-out channel is configured to demodulate the measurement signal using a demodulation signal having a frequency corresponding to the respective beat frequency.

7. The sensor device according to claim 6, wherein each read-out channel further configured to remove DC components of the measurement signal.

8. The sensor device according to claim 1, wherein the plurality of sensors are configured to receive both the first and the second sensor interrogation signals, wherein each sensor is configured to modulate both the first and the second sensor interrogation signal by the measurand to modulate the optical intensity and/or phase of the associated first signal component and second signal component; and wherein the detector is configured to receive the first sensor interrogation signal and the second sensor interrogation signal, both of which being modulated by the plurality of sensors being affected by the measurand.

9. The sensor device according to claim 1, wherein the plurality of sensors are configured to receive the first sensor interrogation signals, wherein each sensor is configured to modulate the first sensor interrogation signal by the measurand to modulate the optical intensity and/or phase of the associated first signal component; and wherein the detector is configured to receive the first sensor interrogation signal being modulated by the plurality of sensors being affected by the measurand and the second sensor interrogation signal being unaffected by the plurality of sensors.

10. The sensor device according to claim 1, wherein each sensor is configured to sense the measurand by the optical resonance frequency of the optical resonance element being changed in dependence of the measurand.

11. The sensor device according to claim 1, wherein each sensor is configured to generate a time-varying modulation of the at least one of the first and second sensor interrogation signal by receiving a time-varying measurand signal.

12. The sensor device according to claim 1, wherein the optical resonance element of each sensor is a waveguide resonator.

13. The sensor device according to claim 1, wherein the detector is a photo-sensitive element configured to detect an intensity of incident light on the photo-sensitive element.

14. A photo-acoustic imaging device comprising:

the sensor device according to claim 1, wherein each sensor of the plurality of sensors comprises an opto-mechanical element for receiving an acoustic wave forming the measurand, and wherein the opto-mechanical element is configured to be affected by the received acoustic wave so as to change the optical characteristic of the optical resonance element.

15. A method for detecting a measurand, said method comprising:

receiving, by a plurality of sensors, at least one of a first and a second sensor interrogation signals, wherein the first sensor interrogation signal comprises a first optical frequency comb of first frequencies defining a plurality of first signal components being separated by a first repetition frequency, wherein the second sensor interrogation signal comprises a second optical frequency comb of second frequencies defining a plurality of second signal components being separated by a second repetition frequency different from the first repetition frequency, wherein each of the plurality of first signal components is associated with a respective one of the plurality of second signal components to form a plurality of signal component pairs, wherein a difference in frequency between the associated first signal component and second signal component is different for different signal component pairs;

modulating, by each sensor, the at least one of the first and second sensor interrogation signal by the measurand, wherein each sensor comprises an optical resonance element having a mutually unique optical resonance frequency and wherein an optical resonance of the optical resonance element of each sensor is associated with one, mutually unique, signal component pair of the plurality of signal component pairs, wherein each sensor modulates an optical intensity and/or phase of at least one of the associated first signal component and second signal component of the mutually unique signal component pair;

receiving, by a detector, the first sensor interrogation signal and the second sensor interrogation signal, at least one of which being modulated by the plurality of sensors being affected by the measurand, and detecting, by the detector, a plurality of beat frequencies corresponding to mutually unique differences in frequency between the associated first signal component and second signal component for different signal component pairs for detecting a plurality of measurements by the plurality of sensors.

* * * * *